(12) United States Patent
Miyoshi (10) Patent No.: US 11,841,514 B2
(45) Date of Patent: Dec. 12, 2023

(54) DRIVE DEVICE INCLUDING MAGNETS AND COIL, IMAGE BLUR CORRECTION DEVICE, AND IMAGE CAPTURING APPARATUS

(71) Applicant: CANON KABUSHIKI KAISHA, Tokyo (JP)

(72) Inventor: Kaori Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/706,936

(22) Filed: Mar. 29, 2022

(65) Prior Publication Data

US 2022/0317470 A1 Oct. 6, 2022

(30) Foreign Application Priority Data

Apr. 2, 2021 (JP) ................. 2021-063577

(51) Int. Cl.
*G02B 27/64* (2006.01)
*G03B 5/04* (2021.01)
(Continued)

(52) U.S. Cl.
CPC ............. *G02B 27/646* (2013.01); *G03B 5/04* (2013.01); *H02K 41/0354* (2013.01);
(Continued)

(58) Field of Classification Search
CPC .................. G02B 27/646; G03B 5/04; G03B 2205/0015; G03B 2205/0069; G03B 3/00; G03B 5/00; G03B 17/14; H02K 41/0354; H02K 41/0356; H02K 2213/03; H04N 23/54; H04N 23/55; H04N 23/687
See application file for complete search history.

(56) References Cited

U.S. PATENT DOCUMENTS

2012/0027391 A1* 2/2012 Okamura ............. H04N 23/687
396/55
2017/0155847 A1* 6/2017 Ito ......................... H04N 23/687
(Continued)

FOREIGN PATENT DOCUMENTS

| JP | 2007-219338 A | 8/2007 |
| JP | 2013-246134 A | 12/2013 |
| JP | 6172993 B2 | 8/2017 |

*Primary Examiner* — Gevell V Selby
(74) *Attorney, Agent, or Firm* — Cowan, Liebowitz & Latman, P.C.

(57) ABSTRACT

A drive device compact in size and capable of moving an optical component with a large stroke while ensuring a required thrust. A movable section holds the optical component. A coil is disposed in one of a fixed section and the movable section, and first and second magnet sections are arranged in the other of them with a predetermined spacing in an optical axis direction of the optical component with the coil interposed therebetween. The drive device moves the movable section in a first direction orthogonal to the optical axis direction. When viewed from the optical axis direction, a distance in the first direction from the optical axis of the optical component to the polarization line of the first magnet section is different from a distance in the first direction from the optical axis to the polarization line of the second magnet section.

17 Claims, 10 Drawing Sheets

(51) Int. Cl.
- *H02K 41/035* (2006.01)
- *H04N 23/54* (2023.01)
- *H04N 23/55* (2023.01)
- *H04N 23/68* (2023.01)

(52) U.S. Cl.
CPC ............ *H04N 23/54* (2023.01); *H04N 23/55* (2023.01); *H04N 23/687* (2023.01); *G03B 2205/0015* (2013.01); *G03B 2205/0069* (2013.01)

(56) References Cited

U.S. PATENT DOCUMENTS

| | | | |
|---|---|---|---|
| 2019/0320119 A1* | 10/2019 | Miyoshi | H04N 23/663 |
| 2021/0149210 A1* | 5/2021 | Fukushima | H04N 23/687 |
| 2021/0297569 A1* | 9/2021 | Iseno | H04N 23/51 |

* cited by examiner

DRIVE DEVICE INCLUDING MAGNETS AND COIL, IMAGE BLUR CORRECTION DEVICE, AND IMAGE CAPTURING APPARATUS

BACKGROUND OF THE INVENTION

Field of the Invention

The present invention relates to a drive device including magnets and a coil, an image blur correction device including the drive device, and an image capturing apparatus including the image blur correction device.

Description of the Related Art

In image capturing apparatuses, there are used a variety of drive devices for driving optical components. As a drive device of this type, there is a demand for a drive device which is capable of driving the optical components with high accuracy and also with a large stroke. Further, to cope with increases in size and weight of the optical components which are moved, there is also a demand for a drive device small in size and large in thrust.

For example, a voice coil motor method is widely used in an image blur correction device which suppresses image blur caused by a shake of a user's hand during photographing, by shifting (displacing) an optical component (lens or image sensor) within a plane perpendicular to an optical axis. In the voice coil motor method, a coil and a magnet are disposed in one and the other of a movable section and a fixed section, respectively, and the movable section is moved relative to the fixed section by using an interaction between a magnetic field generated by causing electric current to flow through the coil and a magnetic field of the magnet.

In a hand shake correction device, to enable correction of image blur even when a large shake of the user's hand occurs, performance of moving the optical component with a large stroke is demanded. At the same time, it is necessary to ensure a required thrust during driving of the optical component. To meet this requirement, Japanese Patent No. 6172993 discloses an image blur correction device in which the configuration of a magnet is contrived so as to increase the thrust. Japanese Patent No. 6172993 discloses a configuration in which magnets are so arranged as to have a coil interposed therebetween to thereby effectively increase a magnetic flux crossing the coil.

Incidentally, to move the movable section with high accuracy, in many cases, an amount of movement of the movable section, in other words, a position of the movable section is detected. As an example of a method of detecting the position of the movable section, there is a magnetic position detection method. In this method, a magnetic sensor that outputs an electrical signal according to a change in magnetic flux density, such as a Hall element or an MR (magnetic resistance) element, is used, and a relative position between a magnet and the magnetic sensor is detected based on the electrical signal that changes in accordance with a relative movement between the magnet and the magnetic sensor. In doing this, in general, the relative position between the magnet and the magnetic sensor is calculated assuming that magnetic flux density that can be detected by the magnetic sensor linearly changes in accordance with the relative movement between the magnetic sensor and the magnet.

Japanese Laid-Open Patent Publication (Kokai) No. 2007-219338 discloses an image blur correction device that uses a magnet for driving the movable section of the drive device based on the above-described voice coil motor method also as a magnet for detecting a position of the movable section. Further, Japanese Laid-Open Patent Publication (Kokai) No. 2013-246134 discloses a position detection device which ensures a position detection stroke by providing a cutout in a magnet or by dividing the magnet into two.

However, in the technique disclosed in Japanese Patent No. 6172993, an attempt of increasing a driving amount (the amount of movement of the movable section) and also ensuring the thrust at a position where the amount of relative movement between the magnetic sensor and the magnet is large inevitably results in an increase in the size of the drive device in a driving direction (direction of movement of the movable section). Further, if the driving amount is increased, it is required to prevent the movable section from colliding with another portion (member) at a location to which the movable section is moved, and hence the drive device is necessarily located outward, resulting in an increase in the size of the hand shake correction device.

In the drive device disclosed in Japanese Laid-Open Patent Publication (Kokai) No. 2007-219338, the position of the movable section is detected by detecting magnetism of the magnet used for driving the movable section, whereby the size of the hand shake correction device is reduced. However, in a range in which magnetic flux density can be detected by the magnetic sensor, a range of linear change is narrow. For this reason, assuming that only the range in which the magnetic flux density linearly changes is set as a range within which the position of the movable section can be detected, the technique disclosed in Japanese Laid-Open Patent Publication (Kokai) No. 2007-219338 is not suitable for a drive device with a large driving amount.

When the driving amount of the movable section is large, it is possible to employ the method disclosed in Japanese Patent No. 6172993 or Japanese Laid-Open Patent Publication (Kokai) No. 2013-246134, as a method of detecting the driving amount or the position of the movable section. However, in the technique disclosed in Japanese Patent No. 6172993, the magnet used for position detection is provided separately from the magnets used for driving the movable section, which increases the number of components, thereby increasing manufacturing costs and making it difficult to achieve space-saving. On the other hand, in the technique disclosed in Japanese Laid-Open Patent Publication (Kokai) No. 2013-246134, since the volume of the magnet is reduced, it is not easy to ensure a sufficient thrust.

SUMMARY OF THE INVENTION

The present invention provides a drive device compact in size, which is capable of moving an optical component with a large stroke while ensuring a required thrust, an image blur correction device including the drive device, and an image capturing apparatus including the image blur correction device.

In a first aspect of the present invention, there is provided a drive device that includes a fixed section and a movable section and relatively moves the fixed section and the movable section in a first direction, including a coil disposed in one of the fixed section and the movable section, and a first magnet section and a second magnet section arranged in the other of the fixed section and the movable section with a predetermined spacing therebetween in a second direction orthogonal to the first direction such that the coil is interposed between the first magnet section and the second magnet section, wherein, when viewed from the second direction, a position of a polarization line of the first magnet section and a position of a polarization line of the second magnet section do not overlap.

In a second aspect of the present invention, there is provided a drive device including a fixed section, a movable section holding an optical member, a coil disposed in one of the fixed section and the movable section, and a first magnet section and a second magnet section arranged in the other of the fixed section and the movable section with a predetermined spacing therebetween in an optical axis direction of the optical member such that the coil is interposed between the first magnet section and the second magnet section, the drive device causing the movable section to move in a first direction orthogonal to the optical axis direction, wherein a length of the first magnet section is smaller than a length of the second magnet section in the first direction, and wherein when viewed from the optical axis direction, a distance in the first direction from an optical axis of the optical member to a center of gravity of the first magnet section is larger than a distance in the first direction from the optical axis to a center of gravity of the second magnet section.

According to the present invention, it is possible to realize a drive device compact in size, which is capable of moving an optical component with a large stroke while ensuring a required thrust.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Here, an image blur correction device of an image capturing apparatus will be described as an embodiment of a drive device according to the present invention.

Figure 1A:
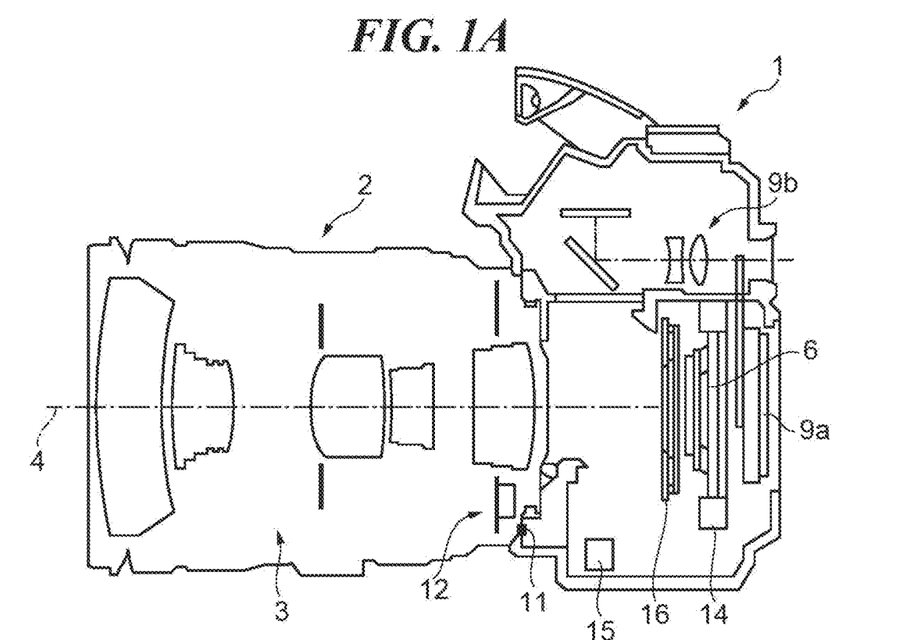
FIGS. 1A and 1B are diagrams useful in explaining the configuration of an image capturing apparatus according to embodiments of the present invention.
Figure 1B:
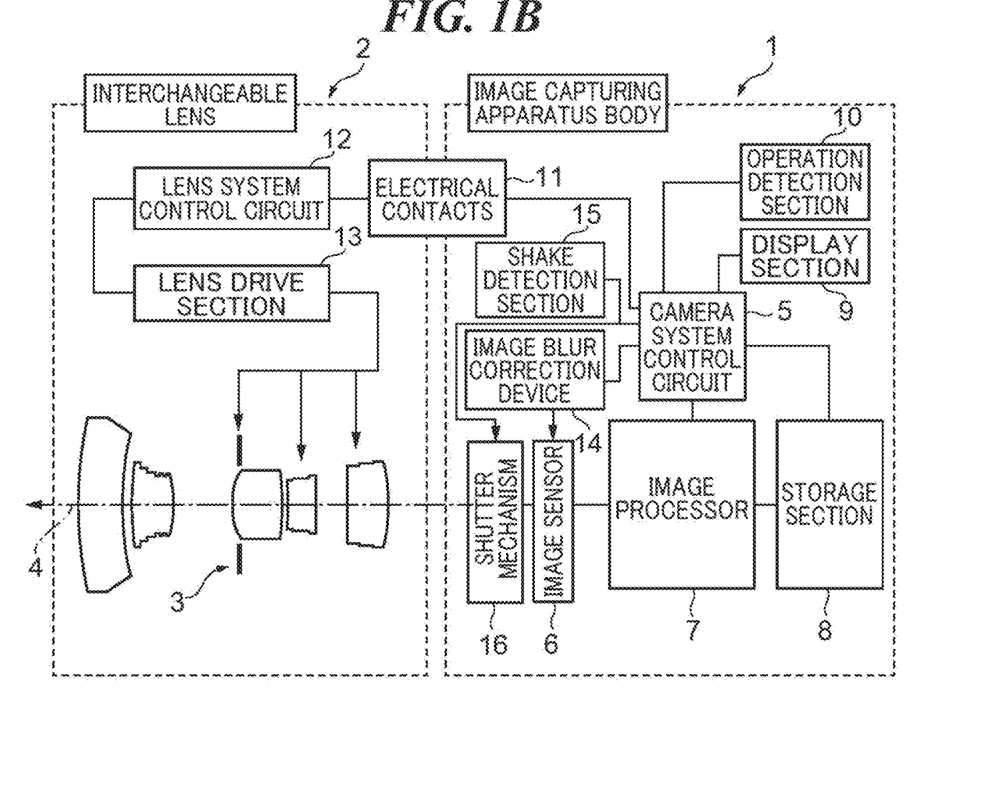

FIG. 1A is a schematic cross-sectional view of an image capturing apparatus according to an embodiment of the present invention. FIG. 1B is a block diagram of the electrical configuration of the image capturing apparatus. The image capturing apparatus is roughly comprised of an image capturing apparatus body 1, and an interchangeable lens 2 which can be removably attached to the image capturing apparatus body 1.

The image capturing apparatus body 1 includes a camera system control circuit 5, an image sensor 6, an image processor 7, a storage section 8, a display section 9, an operation detection section 10, an image blur correction device 14, a shake detection section 15, and a shutter mechanism 16. The display section 9 includes a viewfinder internal display device 9a and a rear display panel 9b. The interchangeable lens 2 includes a lens group 3, a lens system control circuit 12, and a lens drive section 13. In a state in which the interchangeable lens 2 is attached to the image capturing apparatus body 1, the camera system control circuit 5 and the lens system control circuit 12 are communicably connected to each other via electrical contacts 11.

The shake detection section 15 is e.g. a gyro sensor. The shake detection section 15 detects a shake of the image capturing apparatus in a first direction and a third direction orthogonal to each other within a plane perpendicular to a photographing optical axis 4 (a direction therealong, i.e. an optical axis direction is defined as a second direction) and sends signals indicative of amounts of shake to the camera system control circuit 5. The camera system control circuit 5 calculates a target position of the image sensor 6 for reducing image blur of an object image based on the signals acquired from the shake detection section 15. Further, the camera system control circuit 5 calculates amounts of driving in the first direction and the third direction, for moving the image sensor 6 to the target position, and sends the calculated driving amounts to the image blur correction device 14. The image blur correction device 14 controls energization of coils 205, described hereinafter, according to the driving amounts (control signals) received from the camera system control circuit 5, and translates the image sensor 6 within a plane substantially parallel to an imaging surface of the image sensor 6, or rotates the image sensor 6 about the photographing optical axis 4, to thereby move the image sensor 6 to the target position. With this, it is possible to reduce (correct) image blur caused by a shake of the image capturing apparatus due to a shake of a user's hand. Note that out of the members forming the image capturing apparatus, those which are not directly related to image blur correction may be formed by known components, and hence detailed description of them is omitted.

Figure 2:
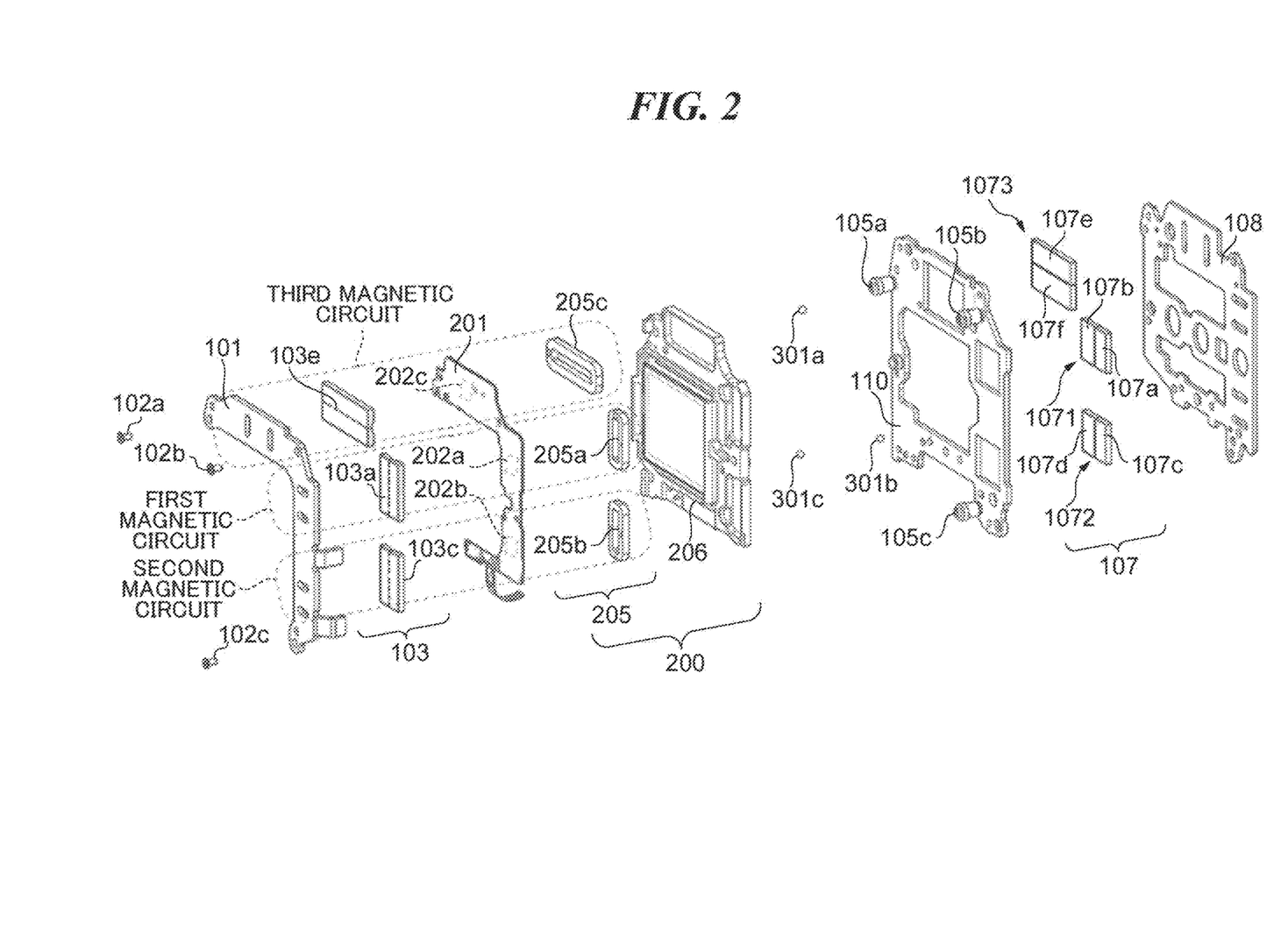
FIG. 2 is an exploded perspective view of an image blur correction device according to a first embodiment of the present invention, which is included in the image capturing apparatus.
Figure 3A:
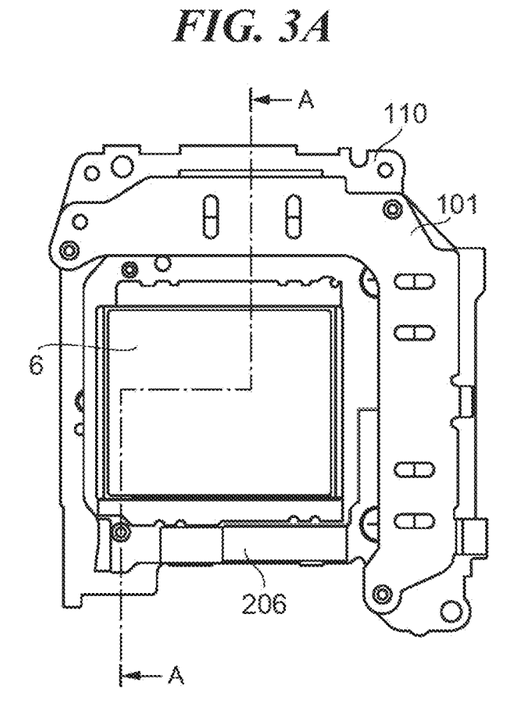
FIGS. 3A and 3B are a front view and a cross sectional view of the image blur correction device shown in FIG. 2.
Figure 3B:
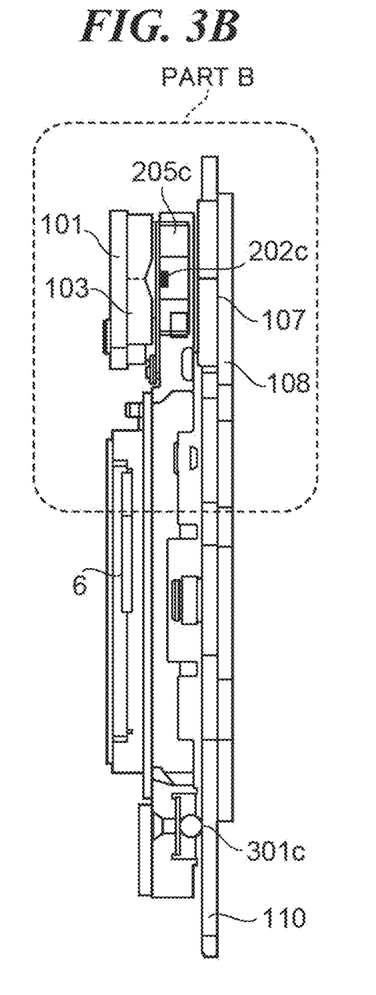

FIG. 2 is an exploded perspective view of the image blur correction device 14 according to a first embodiment of the present invention. FIG. 3A is a front view (as viewed from the optical axis direction) of the image blur correction device 14. FIG. 3B is a cross-sectional view taken along A-A in FIG. 3A.

The image blur correction device 14 includes an upper yoke 101, screws 102a, 102b, and 102c, an upper magnet group 103 (first magnet section), spacers 105a, 105b, and 105c, a lower magnet group 107 (second magnet section), a lower yoke 108, and a base plate 110. Further, the image blur correction device 14 includes an FPC 201, a coil 205, a movable frame 206, and balls 301a, 301b, and 301c.

The upper magnet group 103 has a first upper magnet section 103a, a second upper magnet section 103c, and a third upper magnet section 103e. The lower magnet group 107 has a first lower magnet section 1071, a second lower magnet section 1072, and a third lower magnet section 1073. The first lower magnet section 1071 has lower magnets 107a and 107b. The second lower magnet section 1072 has lower magnets 107c and 107d. The third lower magnet section 1073 has lower magnets 107e and 107f.

The FPC 201 is a flexible printed circuit board, and includes position detection elements 202a, 202b, and 202c mounted thereon. In the following description, when the position detection elements 202a, 202b, and 202c are not distinguished from each other, each of the position detection elements 202a, 202b, and 202c is simply referred to as "the position detection element 202". The coil 205 includes a first coil 205a, a second coil 205b, and a third coil 205c. Note that out of the above members forming the image blur correction device 14, members denoted by reference numerals in 100s form a fixed section, and members denoted by reference numerals in 200s form a movable section 200 which is movable with respect to the fixed section.

Figure 4:
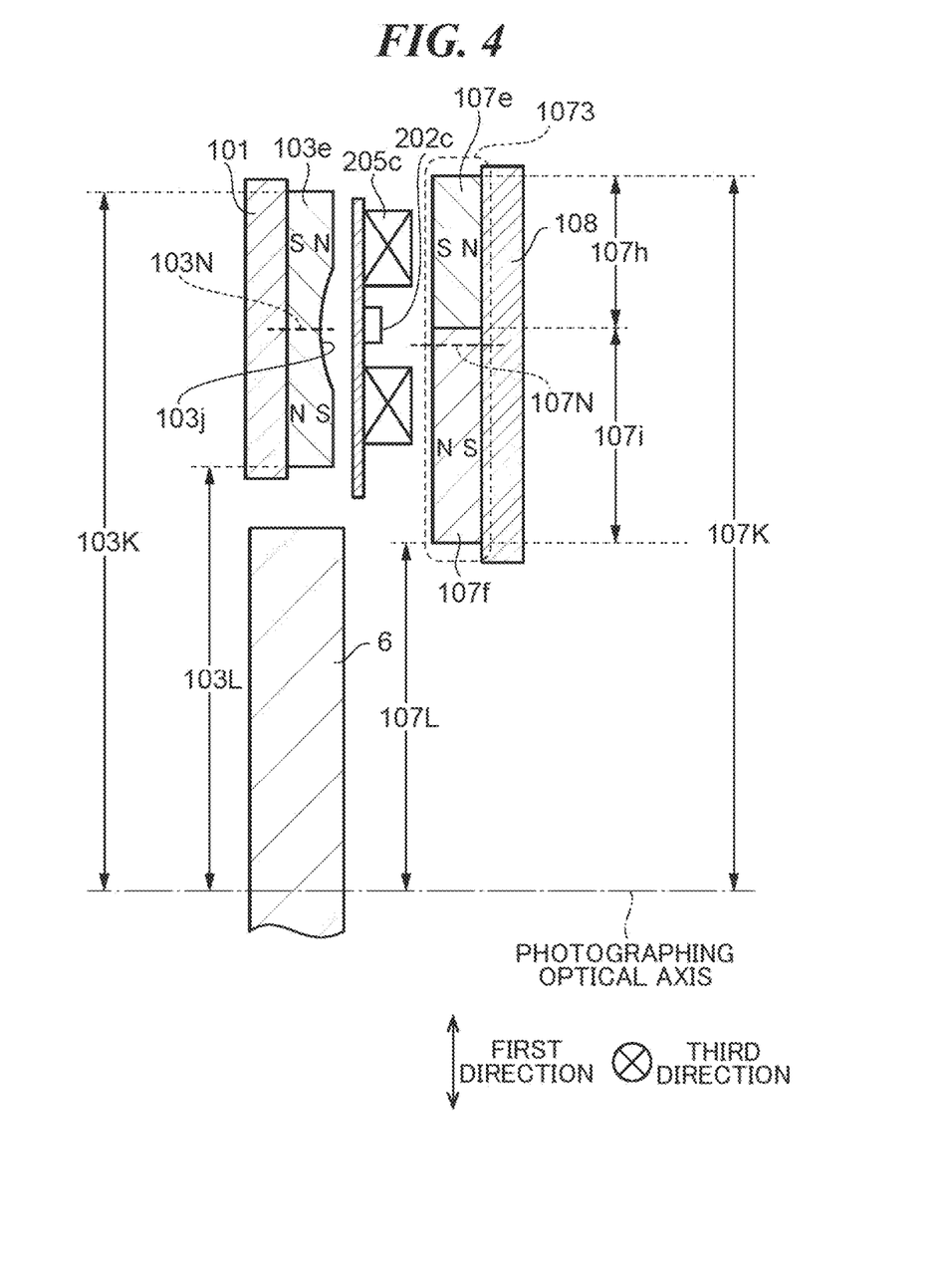
FIG. 4 is an enlarged view of part B in FIG. 3B.

FIG. 4 is an enlarged view of part B appearing in FIG. 3B. However, in FIG. 4, the part B is simplified by omitting members other than members of magnetic circuits, described hereinafter, from illustration. The upper yoke 101, the third upper magnet section 103e, the third lower magnet section 1073, and the lower yoke 108 form a third magnetic circuit. The third magnetic circuit is a so-called closed magnetic circuit. Although not shown, similarly, the upper yoke 101, the first upper magnet section 103a, the first lower magnet section 1071, and the lower yoke 108 form a first magnetic circuit. Further, the upper yoke 101, the second upper magnet section 103c, the second lower magnet section 1072, and the lower yoke 108 form a second magnetic circuit.

The lower magnets 107a, 107b, 107c, 107d, 107e, and 107f are magnetically attracted and fixedly bonded to the lower yoke 108. The magnets forming the lower magnet group 107 are fixed such that the magnetization directions of each pair of magnets disposed adjacent to each other are different from each other in an optical axis direction. For example, as shown in FIG. 4, in the third lower magnet section 1073, the lower magnets 107e and 107f are disposed such that the respective directions of the N poles and S poles of the lower magnet 107e and the lower magnet 107f are opposite to each other. The first lower magnet section 1071 and the second lower magnet section 1072 have the same configuration as that of the third lower magnet section 1073 in the directions of the magnetic poles.

The first upper magnet section 103a, the second upper magnet section 103c, and the third upper magnet section 103e are magnetically attracted and fixedly bonded to the upper yoke 101, respectively.

The first upper magnet section 103a is disposed at a location opposed to the first lower magnet section 1071, and has opposite sides thereof magnetized to the N and S poles such that the magnetization directions of the first upper magnet section 103a are the same as those of the first lower magnet section 1071. Similarly, the second upper magnet section 103c is disposed at a location opposed to the second lower magnet section 1072, and has opposite sides thereof magnetized to the N and S poles such that the magnetization directions of the second upper magnet section 103c are the same as those of the second lower magnet section 1072. Further, the third upper magnet section 103e is disposed at a location opposed to the third lower magnet section 1073, and has opposite sides thereof magnetized to the N and S poles such that the magnetization directions of the third upper magnet section 103e are the same as those of the third lower magnet section 1073.

As shown in FIG. 4, the third upper magnet section 103e has a concave portion 103j arcuate in cross-section formed on a substantially central portion of a surface thereof opposed to the third lower magnet section 1073, along a longitudinal direction of the third upper magnet section 103e (the third direction appearing in FIG. 4). Similarly, the second upper magnet section 103c has a concave portion arcuate in cross-section formed on a substantially central portion of a surface thereof opposed to the second lower magnet section 1072, along a longitudinal direction of the second upper magnet section 103c (the first direction appearing in FIG. 4). Further, the first upper magnet section 103a has a concave portion arcuate in cross-section formed on a substantially central portion of a surface thereof opposed to the first lower magnet section 1071, along a longitudinal direction of the first upper magnet section 103a (the first direction).

Although described in detail hereinafter, the first upper magnet section 103a and the first lower magnet section 1071 are configured as above, respectively, whereby it is possible to generate a large magnetic flux density in the optical axis direction between the first upper magnet section 103a and the first lower magnet section 1071. Similarly, it is possible to generate large magnetic flux densities in the optical axis direction between the second upper magnet section 103c and the second lower magnet section 1072 and between the third upper magnet section 103e and the third lower magnet section 1073, respectively.

Thus, although a strong attracting force is generated between the upper yoke 101 and the lower yoke 108, the upper yoke 101 and the lower yoke 108 are held with a predetermined spacing in the optical axis direction by the spacers 105a, 105b, and 105c. Note that the spacing between the upper yoke 101 and the lower yoke 108 makes it possible to arrange the movable frame 206 and the FPC 201 between the upper magnet group 103 and the lower magnet group 107 and secure a predetermined spacing therebetween.

The spacers 105a, 105b, and 105c are fixed to the upper yoke 101 with the screws 102a, 102b, and 102c. Further, the spacers 105a, 105b, and 105c have body portions thereof provided with rubber, thereby forming a mechanical end (so-called stopper) of the movable frame 206. That is, the mechanical end of the movable frame 206 is configured such that it prevents the movable frame 206 from moving more outward within a plane perpendicular to the photographing optical axis 4 than necessary with respect to the image blur correction device 14.

The movable frame 206 is formed of e.g. magnesium alloy or aluminum alloy, and is light in weight and high in rigidity. The first coil 205a, the second coil 205b, the third coil 205c, and the FPC 201 are fixed to the movable frame 206, to form the movable section 200. The movable section 200 is held on the base plate 110 via the three balls 301a, 301b, and 301c such that the movable section 200 is movable by rolling of these balls 301a, 301b, and 301c. The image sensor 6 is directly or indirectly attached to the movable frame 206 and move in unison with the movable frame 206.

The FPC 201 is disposed on a side of the movable frame 206 toward the upper magnet group 103. The FPC 201 plays a role of electrically connecting the camera system control circuit 5 to the image sensor 6 and the image blur correction device 14. To this end, connectors for electrically connecting the image sensor 6, the coil 205, and the position detection elements 202 are mounted on the FPC 201.

The position detection elements 202a, 202b, and 202c are mounted on the FPC 201 in a state nested within (in inner holes of) the windings of the first coil 205a, the second coil 205b, and the third coil 205c. As the position detection elements 202, Hall elements, for example, are used and detect a position of the movable section 200 with respect to the fixed section, using the first magnetic circuit, the second magnetic circuit, and the third magnetic circuit. Note that magnetic resistance elements can be used as the position detection elements 202.

A position at which each position detection element 202 detects a magnetic flux is closer to the upper magnet group 103 than the lower magnet group 107. That is, a distance between the position detection element 202 and the upper magnet group 103 is shorter than a distance between the position detection element 202 and the lower magnet group 107. A reason for employing this configuration will be described hereinafter.

In the image blur correction device 14, when electric current is caused to flow through the coils 205, a force is generated according to the Fleming's left-hand rule, whereby it is possible to move the movable section 200 with respect to the fixed section. The first magnetic circuit, the second magnetic circuit, and the third magnetic circuit each have one coil inserted therein, whereby three drive sections are formed, which makes it possible to independently drive each drive section. During driving of the movable section 200, in general, feedback control is performed based on an output signal (Hall element signal) from the position detection element 202. This makes it possible to translate the movable section 200 within the plane perpendicular to the photographing optical axis 4 or rotate the movable section 200 about the photographing optical axis 4, with high accuracy. Note that to rotate the movable section 200 about the photographing optical axis 4, it is only required to control output signal values of the position detection elements 202a and 202b such that they are in opposite phases to each other. To control driving of the image blur correction device 14, it is possible to use a known control method, and hence further detailed description is omitted.

Next, a description will be given of external shapes of the magnets which form the upper magnet group 103 and the lower magnet group 107, respectively. The drive section shown in FIG. 4 is formed by inserting the third coil 205c between the third upper magnet section 103e and the third lower magnet section 1073 (the lower magnets 107e and 1070 as components of the third magnetic circuit, and energization of the third coil 205c causes the movable section 200 to be driven in the first direction.

The third upper magnet section 103e is required to be disposed at a location where the third upper magnet section 103e does not collide with (contact) the image sensor 6 when the image sensor 6 has moved by a required amount, and hence is disposed at a location where the shortest distance from the photographing optical axis 4 is '103L'. On the other hand, the third lower magnet section 1073 is disposed at a location where the shortest distance from the photographing optical axis 4 is '107L'. Here, differently from the third upper magnet section 103e, the third lower magnet section 1073 does not overlap the image sensor 6 in the first direction orthogonal to the optical axis direction. In short, so as to prevent the third lower magnet section 1073 from interfering with the image sensor 6 irrespective of the amount of movement of the image sensor 6, a relationship of 103L>107L is set.

On the other hand, the image blur correction device 14 is required to be reduced in size. Therefore, if, as distances related to the size of the outermost shape of the image blur correction device 14, respective outermost distances from the photographing optical axis 4 to the third upper magnet section 103e and the third lower magnet section 1073 are indicated by '103K' and '107K', these distances are approximately equal to each other.

As is clear from the above, in the present embodiment, the length of the third lower magnet section 1073 in the first direction (direction orthogonal to the optical axis direction) is longer than the length of the third upper magnet section 103e in the first direction. Further, '107h' which indicates the length of the lower magnet 107e as a component of the third lower magnet section 1073 in the first direction and '107i' which indicates the length of the lower magnet 107f as a component of the same in the first direction are set to have a relationship of 107h<107i.

Figure 5:
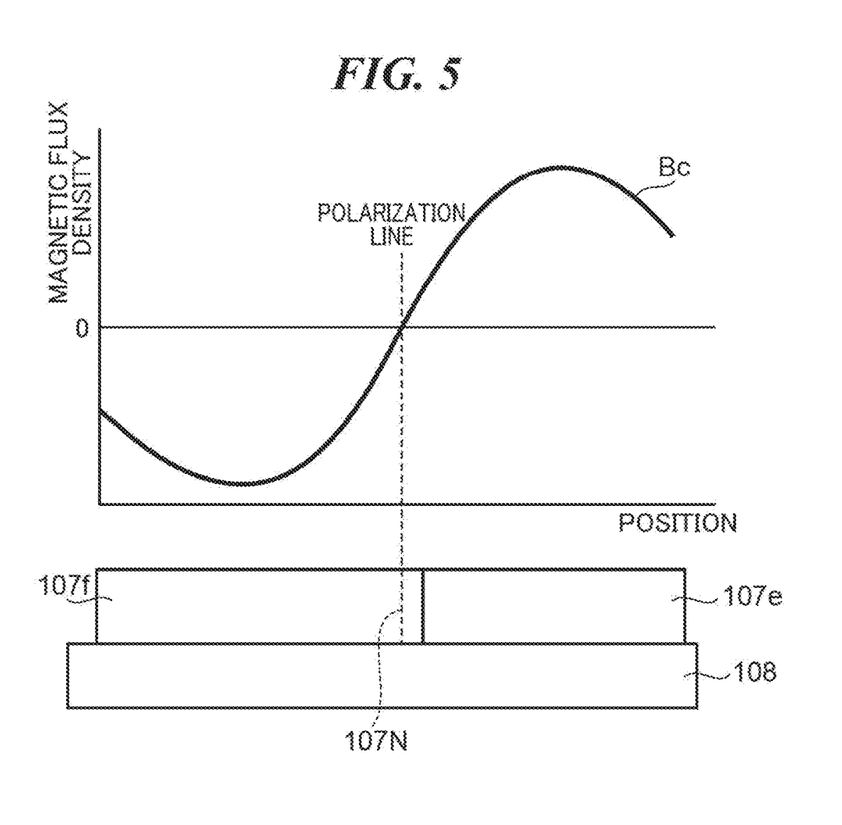
FIG. 5 is a diagram useful in explaining the definition of a polarization line in an upper magnet group and a lower magnet group.

FIG. 5 is a diagram useful in explaining the definition of a polarization line in the upper magnet group 103 and the lower magnet group 107, by taking the third lower magnet section 1073 as an example. A curve Bc appearing in FIG. 5 is a magnetic flux density curve which indicates changes in the magnetic flux density with respect to the positions of the lower magnets 107e and 107f The magnetic flux density is divided into two respective regions on an N pole side and an S pole side of a boundary which is a position where the magnetic flux density is zero (0). A polarization line 107N of the third lower magnet section 1073 is defined as a line that passes through the boundary between the N pole and the S pole on the curve Bc. More specifically, the polarization line 107N of the third lower magnet section 1073 passes through not outer shape contact positions of the lower magnets 107e and 107f but an imaginary position within the lower magnet 107f Further, the polarization line 107N passes through the center of gravity or its vicinity of the third lower magnet section 1073.

A polarization line 103N of the third upper magnet section 103e is located at almost the center of the third upper magnet section 103e in the first direction according to the definition in FIG. 5, as shown in FIG. 4. That is, the polarization line 103N of the third upper magnet section 103e passes through the center of gravity or its vicinity of the third upper magnet section 103e. Therefore, the polarization line 103N of the third upper magnet section 103e and the polarization line 107N of the third lower magnet section 1073 do not match, when viewed from the optical axis direction, and are displaced from each other in the first direction. A reason why the above configuration is employed will be described hereinafter.

Figure 6:
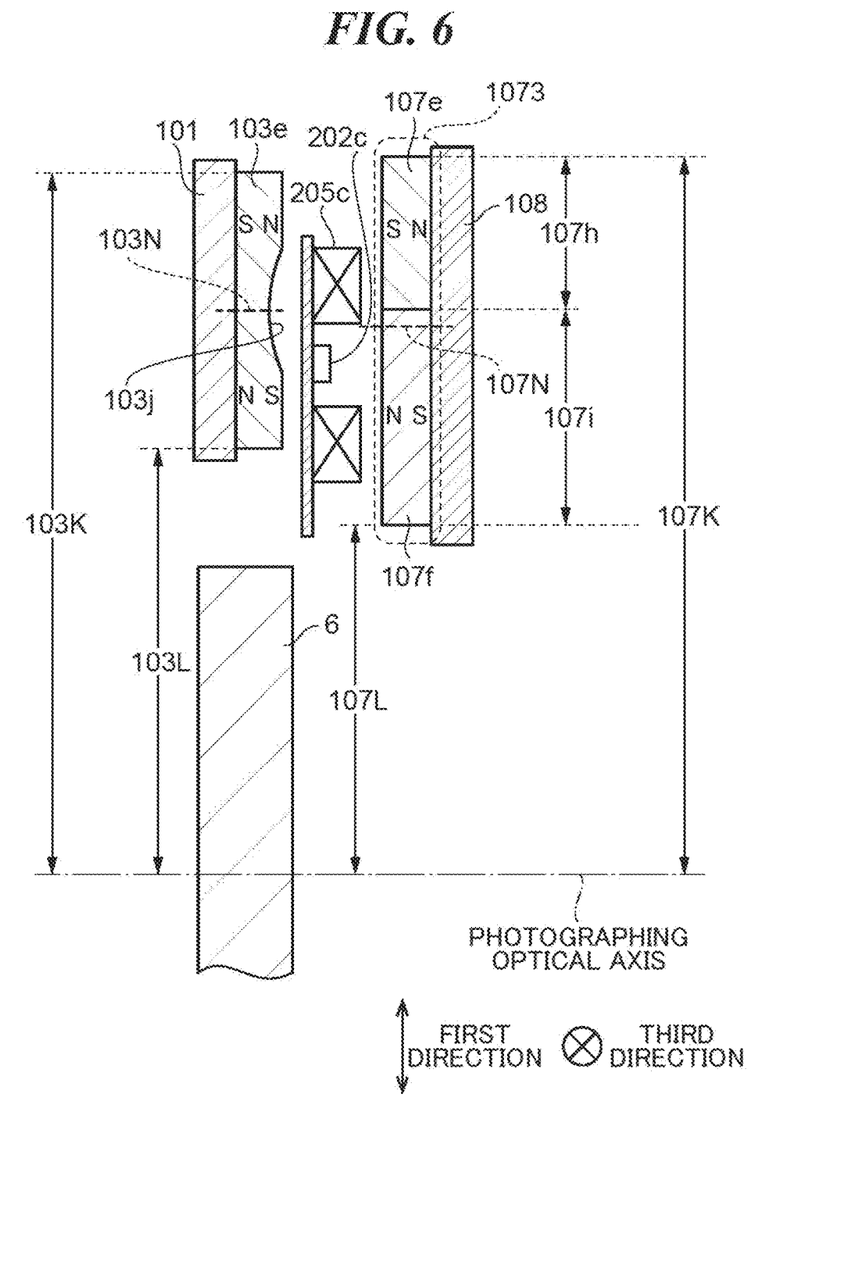
FIG. 6 is a view showing a movable section in a state moved in a downward direction from the state shown FIG. 4, in a simplified illustration similar to FIG. 4.

FIG. 6 is a view showing the movable section 200 in a state moved in a downward direction (downward in the first direction) from the state shown FIG. 4, in a simplified illustration similar to FIG. 4. When the movable section 200 moves in the downward direction, relative positions of the third coil 205c with respect to the third upper magnet section 103e and the third lower magnet section 1073 are changed.

Figure 10:
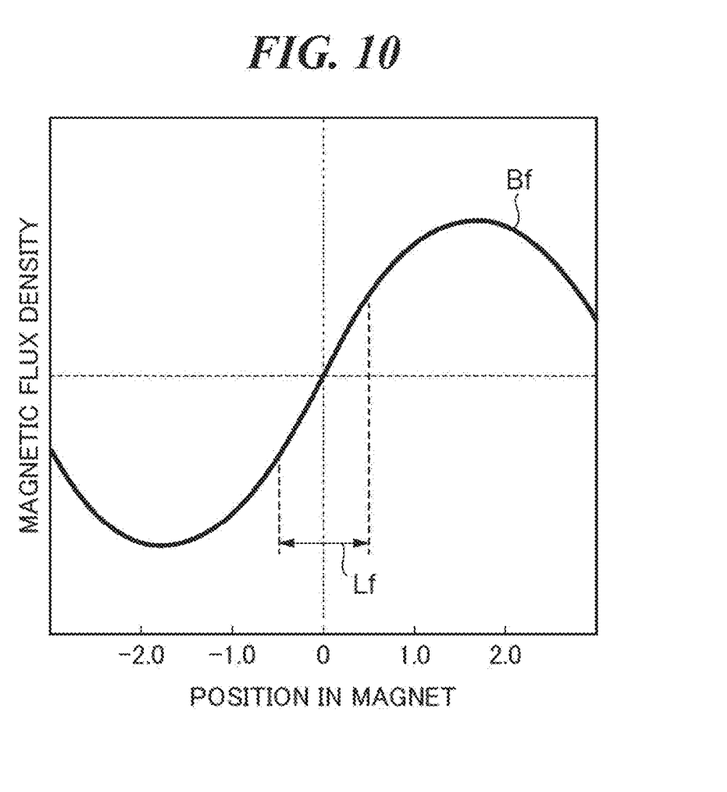
FIG. 10 is a diagram showing a relationship between a position in a magnet and a magnetic flux density in a conventional image blur correction device.

Now, FIG. 10 shows a graph which is useful in explaining a relationship between a position in a magnet and a magnetic flux density in a configuration in which a polarization line of a conventional upper magnet section and a polarization line of a conventional lower magnet section match each other, when viewed from the optical axis direction. A curve Bf is a magnetic flux density curve, and a linearly changing range Lf is a range of magnetic flux densities generally used by a magnetic sensor for detecting a position of a movable section.

In each of the conventional magnet sections, the polarization line thereof is located at a center thereof (where the position in the magnet is zero (0) on a horizontal axis in FIG. 10), and the magnetic flux density is reduced toward the center and ends (ends in the first direction) of the magnet section. A portion of the winding of a coil opposed to a region where the magnetic flux density is smaller generates a smaller thrust. Assuming that the coil has moved beyond the polarization lines of the magnets and farther, a portion of winding of the coil opposed to the region where the coil has moved beyond the polarization lines and farther generates a force in a direction opposite to a direction in which the movable section is desired to be driven. That is, as the amount of movement of the movable section is increased, the thrust is lowered.

In contrast, the image blur correction device 14 is configured such that the polarization line 103N of the third upper magnet section 103e and the polarization line 107N of the third lower magnet section 1073 do not match, when viewed from the optical axis direction. More specifically, when viewed from the optical axis direction, a distance in the first direction from the photographing optical axis 4 to the polarization line 103N is larger than a distance in the first direction from the photographing optical axis 4 to the polarization line 107N.

With this, as shown in FIG. 6, even in a state in which the third coil 205c extends off an end of the third upper magnet section 103e, the third coil 205c is in a position opposed to the third lower magnet section 1073 without extending off the polarization line 107N. Especially, the third coil 205c is opposed to the lower magnet 107f of the third lower magnet section 1073 in a region where the magnetic flux density is high. Therefore, the image blur correction device 14 is capable of maintaining a large thrust even in a moved state of the movable section 200.

Further, as described hereinabove, the third upper magnet section 103e has the central portion thereof formed with the concave portion 103j arcuate in cross-section along the third direction (direction orthogonal to the first direction and the optical axis direction). The reason for this will be described in detail hereinafter.

Figure 7:
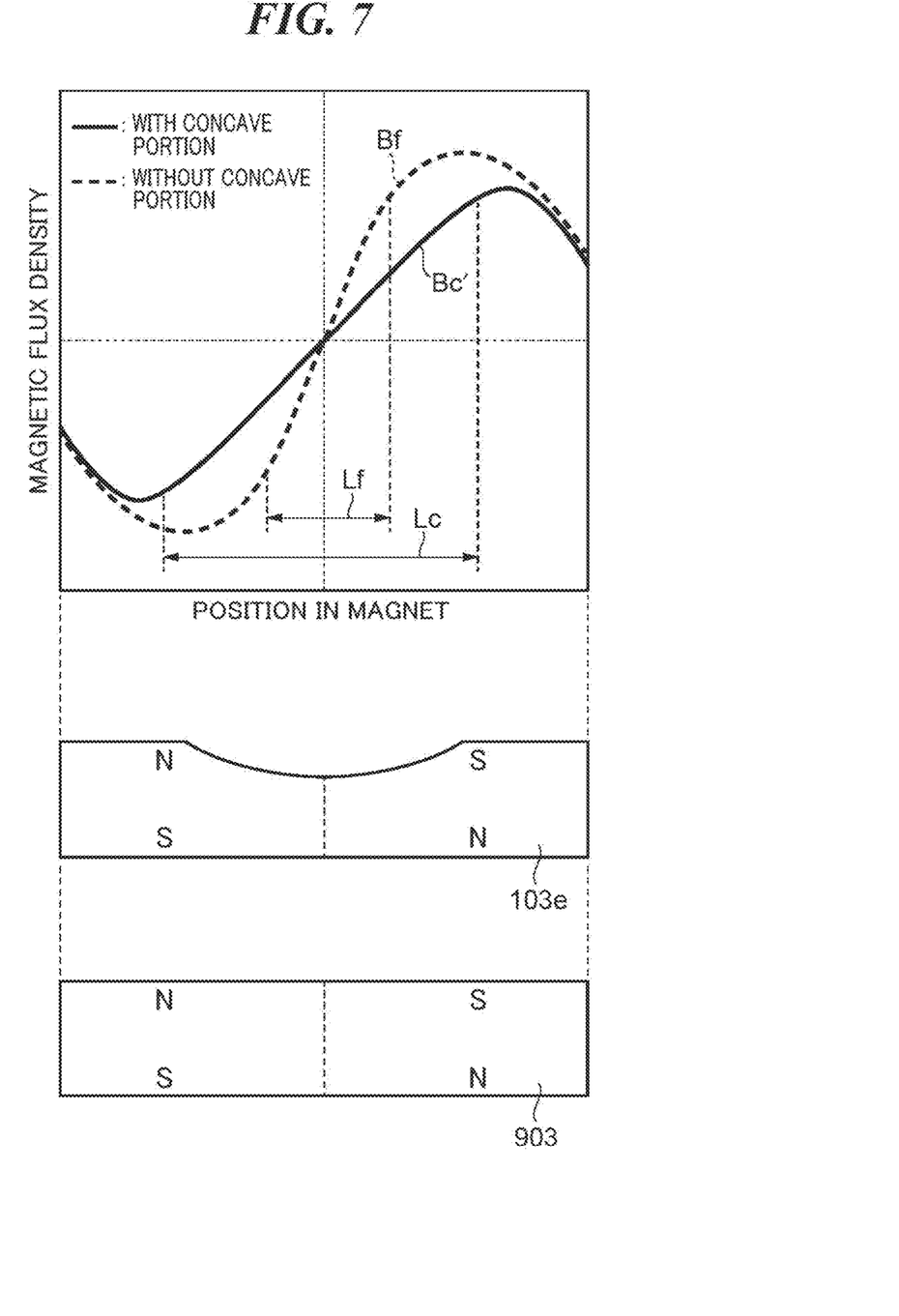
FIG. 7 is a diagram showing a relationship between a position in a magnet and a magnetic flux density in the image blur correction device, in a comparison between the upper magnet group of the present embodiment and a conventional magnet.

FIG. 7 is a diagram useful in explaining changes in a magnetic flux density detected by the position detection element 202c with respect to a position in a magnet. A curve Bc' appearing in FIG. 7 shows changes in the magnetic flux density with respect to the position of the third upper magnet section 103e. On the other hand, a curve Bf is the same as the curve Bf appearing in FIG. 10, and shows changes in the magnetic flux density with respect to a position of a magnet 903 according to the example of the conventional upper magnet section, which does not include the concave portion 103j. An almost linear range Lc of the curve Bc' represents a stroke that makes it possible to perform position detection, in the image blur correction device 14 using the third upper magnet section 103e, according to the present embodiment. Further, the almost linear range Lf of the curve Bf represents a stroke that makes it possible to perform position detection, in a conventional image blur correction device using the magnet 903. It is understood from a comparison between the range Lc and the range Lf that the range Lc is wider than and the range Lf. That is, the image blur correction device 14 is configured to be capable of detecting the position of the movable section 200 even when the movable section 200 is largely moved.

As described above, although it is possible to increase the detection range of the position of the movable section 200 by forming the concave portion 103j on the magnet, the concave portion 103j is formed on the upper magnet group 103, not on the lower magnet group 107. The reason for this is that the lower magnet group 107 having a length in the first direction longer than the upper magnet group 103 plays a role of ensuring the thrust by increasing the magnetic field using magnets increased in size to the maxim. Further, to cause the upper magnet group 103 having a length in the first direction shorter than the lower magnet group 107 to play a role of increasing the position detection range, the concave portion 103j is formed on the upper magnet group 103.

Incidentally, in the image blur correction device 14, the position detection element 202 is disposed at a location closer to the upper magnet group 103 than the lower magnet group 107 (see FIG. 4). With this, it is possible to detect a magnet flux having a characteristic as indicated by the curve Bc' appearing in FIG. 7. Assuming that the position detection element 202 is provided at a location close to the lower magnet group 107, a magnet flux having a characteristic as indicated by the curve Bf appearing in FIG. 7 is detected, which reduces the linear range, thereby making it unsuitable to detect a large stroke.

As described above, in the image blur correction device 14 according to the first embodiment, it is possible to increase the detection range of the position of the movable section 200. In other words, it is possible to increase the stroke for driving the movable section 200. In doing this, it is possible to realize size reduction of the image blur correction device 14 while sufficiently increasing the thrust.

Although the drive section comprised of the third upper magnet section 103e, the third lower magnet section 1073, and the third coil 205c has been described as an example of the characterizing feature of the configuration of the image blur correction device 14, the same is applied to the other two drive sections (magnetic circuits). More specifically, in a drive section formed by inserting the first coil 205a between the first upper magnet section 103a and the first lower magnet section 1071 (the lower magnets 107a and 107b) as components of the first magnetic circuit, energization of the first coil 205a generates a thrust for moving the movable section 200 in the third direction. Similarly, also in a drive section formed by inserting the second coil 205b between the second upper magnet section 103c and the second lower magnet section 1072 (the lower magnets 107c and 107d) as components of the second magnetic circuit, energization of the second coil 205b generates a thrust for moving the movable section 200 in the third direction. A relationship between the magnets in these drive sections in the lengths thereof and the concave portion is the same as a relationship between the magnets in the drive section formed by the third upper magnet section 103e, the third lower magnet section 1073 and the third coil 205c, and hence description thereof is omitted.

Next, an image blur correction device according to a second embodiment of the present invention will be described. The image blur correction device according to the second embodiment differs from the image blur correction device 14 according to the first embodiment only in the configuration of an upper magnet group and a lower magnet group. In the following, description is given by focusing on the above different point, and the description of the same configuration as that of the image blur correction device 14 is omitted.

Figure 8:
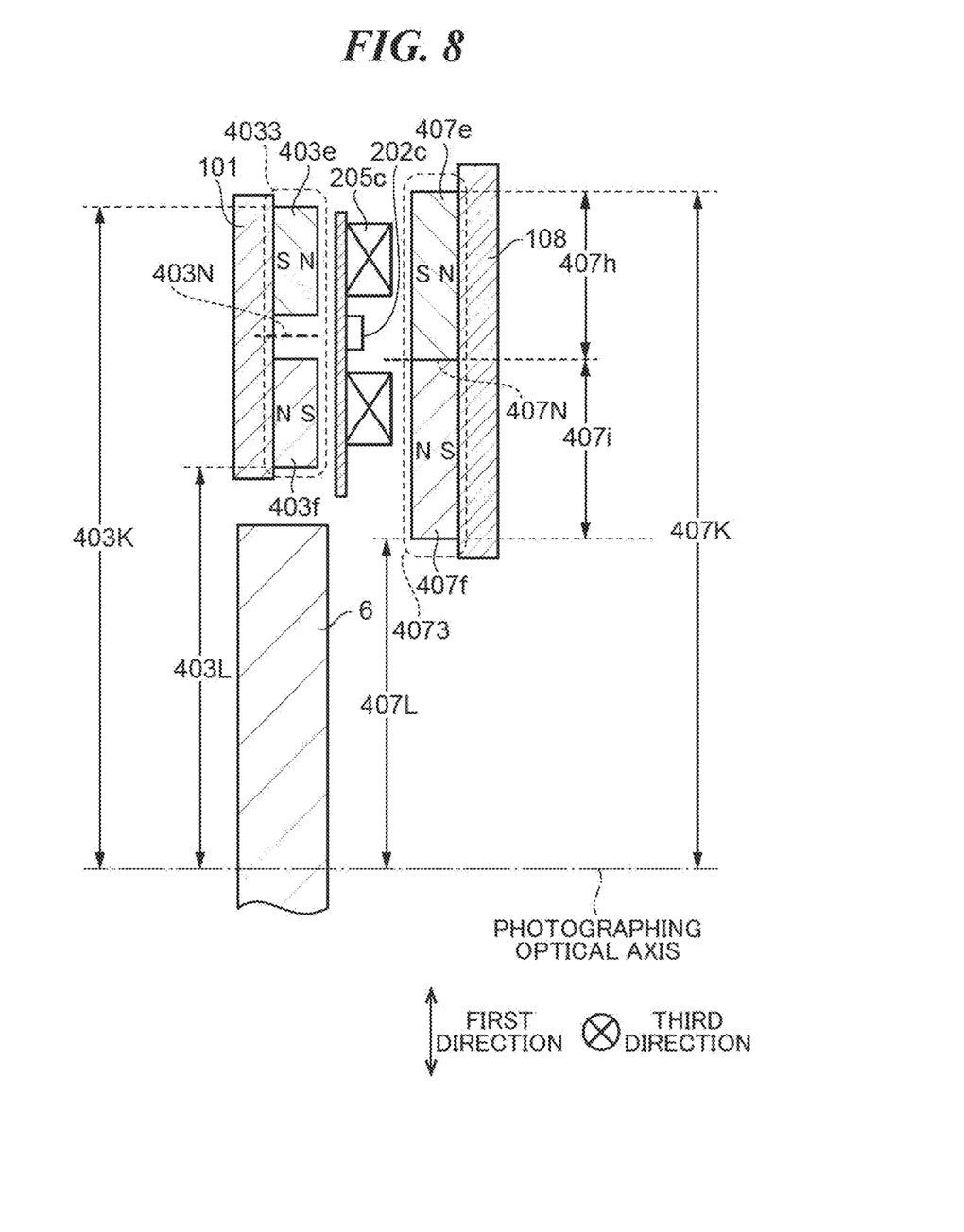
FIG. 8 is a cross-sectional view showing a schematic configuration of an image blur correction device according to a second embodiment.

FIG. 8 is a cross-sectional view, similar to FIG. 4, showing the configuration of a third upper magnet section 4033 and a third lower magnet section 4073 of the image blur correction device according to the second embodiment (although not shown, denoted by reference numeral 14A so as to distinguish from the blur correction device 14 according to the first embodiment). Note that the image blur correction device 14A has three drive sections (magnetic circuits), and FIG. 8 illustrates a drive section comprised of the third upper magnet section 4033, the third lower magnet section 4073, and the third coil 205c as a representative of the three drive sections. Further, in FIG. 8, members of the image blur correction device 14A corresponding to those of the image blur correction device 14 according to the first embodiment are denoted by the same reference numerals.

The third upper magnet section 4033 is comprised of upper magnets 403e and 403f, and the third lower magnet section 4073 is comprised of lower magnets 407e and 407f. A thrust for moving the movable section 200 in the first direction is generated by energizing the third coil 205c disposed in a magnetic field formed by the third upper magnet section 4033 and the third lower magnet section 4073.

The same magnets are used for the upper magnet 403e and the upper magnet 403f, and the upper magnet 403e and the upper magnet 403f are arranged in the upper yoke 101 such that the magnetization direction of the upper magnet 403e and the magnetization direction of the upper magnet 403f are opposite to each other in the optical axis direction. Therefore, the upper magnet 403e and the upper magnet 403f have the same length in the first direction. Further, the upper magnet 403e and the upper magnet 403f are held on the upper yoke 101 with a predetermined spacing (gap) in the first direction. Since the upper magnet 403e and the upper magnet 403f have the same length in the first direction, a polarization line 403N of the third upper magnet section 4033 is located at almost the center between the upper magnet 403e and the upper magnet 403f. The upper magnet 403f is required to be disposed at a location where the upper magnet 403f does not collide with (contact) the image sensor 6 when the image sensor 6 has moved by a required amount, and therefore is disposed at a location where a distance from the photographing optical axis 4 is set to '403L'.

On the other hand, the lower magnet 407f as a component of the third lower magnet section 4073 is disposed at a location where a distance from the photographing optical axis 4 is set to '407L'. Differently from the third upper magnet section 4033, the third lower magnet section 4073 does not overlap the image sensor 6 in the first direction orthogonal to the optical axis direction, so that the third lower magnet section 4073 does not interfere with the image sensor 6 irrespective of the amount of movement of the image sensor 6, and hence a relationship of 403L>407L is set.

The image blur correction device 14A as well is required to be reduced in size. Therefore, similar to the image blur correction device 14, also in the image blur correction device 14A, respective outermost distances from the photographing optical axis 4 to the upper magnet 403e and the lower magnet 407e are indicated by '403K' and '407K', and these distances are approximately equal to each other, i.e. a relationship of 403K≈407K is set. Further, since the same magnet is used for the lower magnet 407e and the lower magnet 407f, a length '407h' of the lower magnet 407e in the first direction and a length '407i' of the lower magnet 407f in the first direction are approximately equal to each other.

The lower magnet 407e and the lower magnet 407f are arranged in the lower yoke 108 such that the magnetization direction of the lower magnet 407e and the magnetization direction of the lower magnet 407f are opposite to each other in the optical axis direction, and the lower magnet 407e and the lower magnet 407f contact each other in the first direction. Therefore, a polarization line 407N of the third lower magnet section 4073 is located at approximately the same position as the contact surfaces of the lower magnet 407e and the lower magnet 407f. As a result, the polarization line 403N of the third upper magnet section 4033 and the polarization line 407N of the third lower magnet section 4073 do not match, when viewed from the optical axis direction, and are displaced from each other in the first direction.

Figure 9:
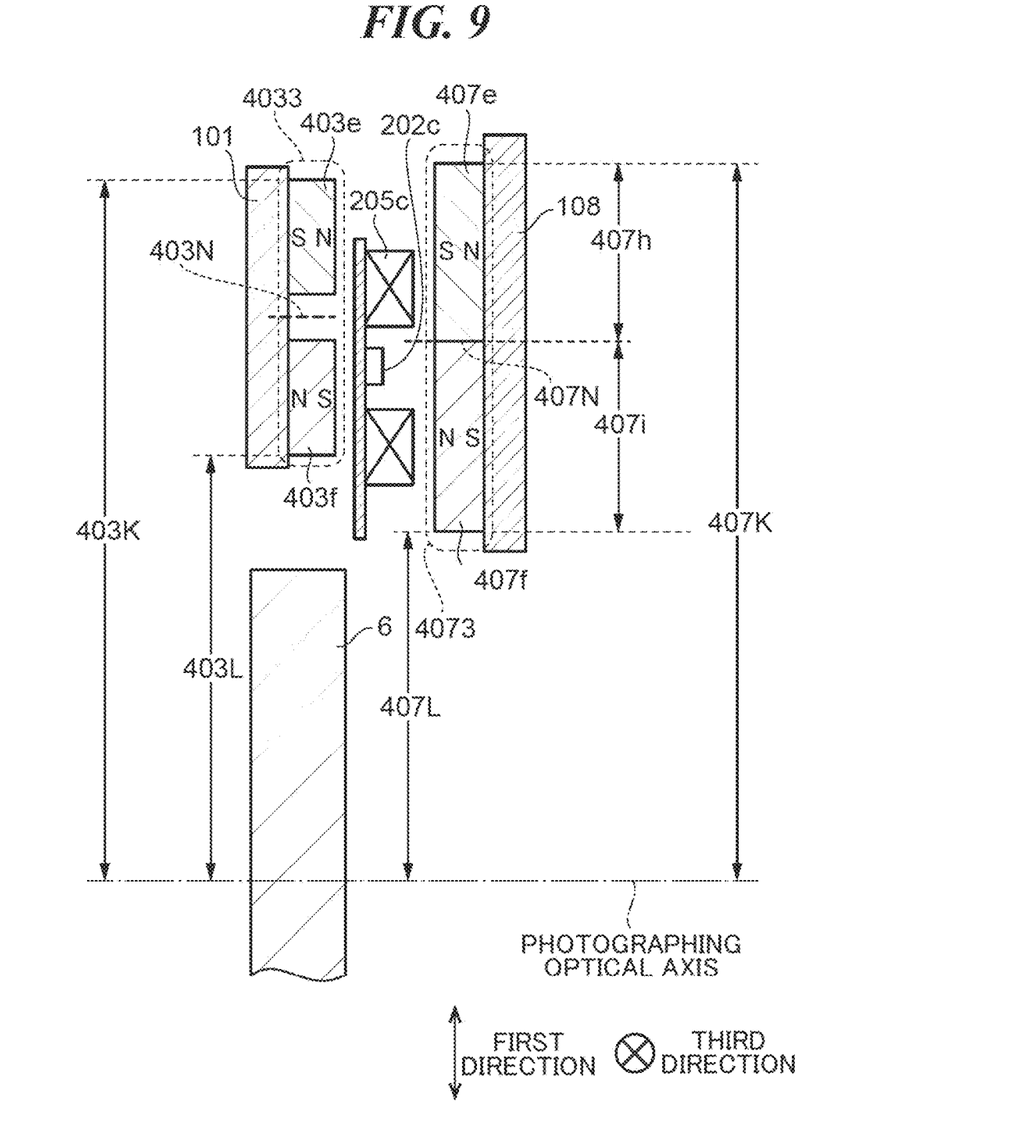
FIG. 9 is a view showing the movable section in a state moved in a downward direction from a state shown in FIG. 8, in a simplified illustration similar to FIG. 8.

A reason why the polarization line 403N and the polarization line 407N are not caused to match each other, when viewed from the optical axis direction, will be described with reference to FIG. 9. FIG. 9 is a view showing the movable section 200 in a state moved in the downward direction from the state shown in FIG. 8, in a simplified illustration similar to FIG. 8. As in the FIG. 9 state, even when the third coil 205c is placed in a state in which a whole region thereof is not opposed to the third upper magnet section 4033, almost the whole region of the third coil 205c is opposed to the third lower magnet section 4073 in a range where the magnet flux density is high. This makes it possible to maintain a high thrust in the image blur correction device 14A as well.

Incidentally, the upper magnet 403e and the upper magnet 403f are arranged with a predetermined spacing therebetween in the first direction because, similar to the first embodiment, it is possible to increase the range in which the position of the movable section 200 can be detected, in other words, because it is possible to increase the stroke over which the movement of the movable section 200 can be controlled. Since this configuration is known, detailed description thereof is omitted.

In the image blur correction device 14A, the total volume of the magnets of the upper magnet section is reduced, and the range in which the magnetic flux density is linearly changed is narrowed, compared with the image blur correction device 14 according to the first embodiment. However, this configuration of the image blur correction device 14A is effective in the use in which the detection stroke may be short, since the shape of the upper magnets 403e and 403f is simple and there is no need to form the concave portion 103j as in the third upper magnet section 103e. Further, by increasing the volume of the third lower magnet section 4073 to thereby compensate for thrust decrease caused by reduction of the volume of the magnets of the third upper magnet section 4033, it is possible to ensure a required driving force. Note that also in the image blur correction device 14A, similar to the image blur correction device 14, the third upper magnet section 4033 is caused to play the role of increasing the position detection range, and hence the position detection element 202c is disposed at a location closer to the third upper magnet section 4033 than the third lower magnet section 4073.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the configuration of the upper magnet sections of the first embodiment and the configuration of the lower magnet sections of the second embodiment may be combined. Inversely, the configuration of the upper magnet sections of the second embodiment and the configuration of the lower magnet sections of the first embodiment may be combined. Further, although in the image blur correction device 14, the magnet is used which has a concave portion formed on each of the upper magnet sections of the upper magnet group, and has opposite sides thereof integrally magnetized to the N and S poles, the same configuration may be realized by bringing two magnets having edges thereof cut away into contact with each other. Furthermore, although the description has been given of the image blur correction device formed by three drive sections having the same configuration, it is not necessary for all the three drive sections to have the same configuration.

The drive device according to the present invention is realized by disposing a coil in one of the fixed section and the movable section and magnets in the other of them. Although in the above-described embodiments, to minimize the weight of the movable section, the coil is disposed in the movable section, and the magnets are disposed in the fixed section, inversely, it is also possible to dispose the magnets in the movable section and the coil in the fixed section. Further, in the above-described embodiments, the image blur correction device of the image capturing apparatus is taken as an example of application of the drive device according to the present invention, and further in this case, the image sensor is taken as an example of an optical member used for image blur correction. However, this is not limitative, but the drive device according to the present invention can be applied to an image blur correction device that drives an image blur correction lens provided in an interchangeable lens within a plane substantially perpendicular to the photographing optical axis.

Furthermore, the drive device according to the present invention can be applied not only to the image capturing apparatus but also to any suitable application insofar as it moves the movable section within a plane. As an example of application of the drive device according to the present invention, there may be mentioned an X-Y stage. It is possible to employ a configuration in which one or a desired plurality of drive sections is/are provided according to an apparatus to which the drive device according to the present invention is applied.

This application claims the benefit of Japanese Patent Application No. 2021-063577, filed Apr. 2, 2021, which is hereby incorporated by reference herein in its entirety.

What is claimed is:

1. A drive device that includes a fixed section and a movable section and relatively moves the fixed section and the movable section in a first direction, comprising:
   a coil disposed in one of the fixed section and the movable section; and
   a first magnet section and a second magnet section arranged in the other of the fixed section and the movable section with a predetermined spacing therebetween in a second direction orthogonal to the first direction such that the coil is interposed between the first magnet section and the second magnet section,
   wherein, when viewed from the second direction, a position of a polarization line of the first magnet section and a position of a polarization line of the second magnet section do not overlap, and
   wherein the polarization line of the first magnet section and the polarization line of the second magnet section are parallel to the second direction.

2. The drive device according to claim 1, wherein the movable section holds an optical member, and
   wherein the second direction is parallel to an optical axis direction of the optical member.

3. The drive device according to claim 1, wherein when viewed from the second direction, in the first direction, a distance from an optical axis of the optical member to a polarization line of the first magnet section is different from a distance from the optical axis to a polarization line of the second magnet section.

4. The drive device according to claim 3, wherein a concave portion is formed at a central portion, in the first direction, of a surface of the first magnet section, which is opposed to the coil, along a direction orthogonal to the optical axis direction and the first direction.

5. The drive device according to claim 3, wherein the first magnet section has two magnets having the same length in the first direction, and
   wherein the two magnets are disposed with a predetermined spacing therebetween in the first direction.

6. The drive device according to claim 3, further comprising a detector for detecting a position of the movable section, and
   wherein the detector is disposed at a location closer to the first magnet section than the second magnet section in the optical axis direction.

7. The drive device according to claim 6, wherein the movable section includes a flexible printed circuit board holding the coil, and
   wherein the detector is mounted in an inner hole of the coil on the flexible printed circuit board.

8. An image blur correction device comprising:
   a drive device according to claim 1; and
   an image sensor or an image blur correction lens, which is held in the movable section,
   wherein the movable section is capable of moving within a plane substantially parallel to an imaging surface of the image sensor or within a plane substantially perpendicular to an optical axis of the image blur correction lens.

9. An image blur correction device comprising:
   a drive device according to claim 6; and
   an image sensor or an image blur correction lens, which is held in the movable section,
   wherein the movable section is capable of moving within a plane substantially parallel to an imaging surface of the image sensor or within a plane substantially perpendicular to an optical axis of the image blur correction lens.

10. An image capturing apparatus including an image blur correction device according to claim 8.

11. An image capturing apparatus including an image blur correction device according to claim 9.

12. A drive device comprising:
   a fixed section;
   a movable section holding an optical member;
   a coil disposed in one of the fixed section and the movable section; and
   a first magnet section and a second magnet section arranged in the other of the fixed section and the movable section with a predetermined spacing therebetween in an optical axis direction of the optical member such that the coil is interposed between the first magnet section and the second magnet section,
   the drive device causing the movable section to move in a first direction orthogonal to the optical axis direction,
   wherein a length of the first magnet section is smaller than a length of the second magnet section in the first direction, and
   wherein when viewed from the optical axis direction, a distance in the first direction from an optical axis of the optical member to a center of gravity of the first magnet section is larger than a distance in the first direction from the optical axis to a center of gravity of the second magnet section.

13. The drive device according to claim 12, wherein the second magnet section is disposed at a location in the optical axis direction where the second magnet section does not contact the optical member even when the optical member is moved in the first direction.

14. The drive device according to claim 12, wherein a concave portion is formed at a central portion, in the first direction, of a surface of the first magnet section, which is opposed to the coil, along a direction orthogonal to the optical axis direction and the first direction.

15. The drive device according to claim 12, wherein the first magnet section has two magnets having the same length in the first direction, and
wherein the two magnets are disposed with a predetermined spacing therebetween in the first direction.

16. The drive device according to claim 12, further comprising a detector for detecting a position of the movable section, and
wherein the detector is disposed at a location closer to the first magnet section than the second magnet section in the optical axis direction.

17. The drive device according to claim 16, wherein the movable section includes a flexible printed circuit board holding the coil, and
wherein the detector is mounted in an inner hole of the coil on the flexible printed circuit board.

* * * * *